United States Patent
Guguen

(10) Patent No.: US 9,954,465 B2
(45) Date of Patent: Apr. 24, 2018

(54) DYNAMIC LIMITATION DEVICE AND DYNAMIC LIMITATION METHOD IMPLEMENTING A DEVICE OF THIS KIND

(71) Applicant: THALES, Courbevoie (FR)

(72) Inventor: Stéphane Guguen, Chatou (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/332,816

(22) Filed: Oct. 24, 2016

(65) Prior Publication Data
US 2017/0126151 A1 May 4, 2017

(30) Foreign Application Priority Data
Nov. 4, 2015 (FR) ...................................... 15 02322

(51) Int. Cl.
- H02P 7/00 (2016.01)
- H02P 1/04 (2006.01)
- H02P 21/14 (2016.01)
- H02P 27/06 (2006.01)

(52) U.S. Cl.
CPC ................ H02P 1/04 (2013.01); H02P 21/14 (2013.01); H02P 27/06 (2013.01)

(58) Field of Classification Search
CPC ............. H02P 1/04; H02P 21/14; H02P 27/06
USPC ........................................................ 318/434
See application file for complete search history.

(56) References Cited

U.S. PATENT DOCUMENTS

| 4,268,781 A | 5/1981 | Kawada et al. |
| 4,926,105 A * | 5/1990 | Mischenko ............. H02P 21/06 318/800 |
| 5,097,193 A * | 3/1992 | Neis ......................... H02P 5/46 318/800 |
| 2006/0006836 A1 * | 1/2006 | Miehlich ............ A63B 21/0058 318/807 |
| 2010/0283420 A1 | 11/2010 | Gutmann et al. |
| 2011/0084638 A1 * | 4/2011 | Patel ....................... B60K 1/02 318/400.32 |

(Continued)

FOREIGN PATENT DOCUMENTS

| DE | 23 37 722 A1 | 2/1975 |
| EP | 2 197 103 A2 | 6/2010 |

(Continued)

*Primary Examiner* — Bentsu Ro
*Assistant Examiner* — Gabriel Agared
(74) *Attorney, Agent, or Firm* — Baker & Hostetler LLP

(57) ABSTRACT

A dynamic limitation device of a dynamic output parameter of an electric motor capable of receiving a working setpoint comprises: a generator of a dynamic maximum current proportional to a first working setpoint of the motor to supply the motor to generate a rotating torque of a shaft of the electric motor as a function of the first setpoint, a first estimator of a first dynamic output parameter of the electric motor, and a first dynamic limiter of the first output parameter of the motor, which comprises: a first comparator of the value of the first estimated parameter with a predefined maximum value of the first parameter, a first corrector to generate a first correction current, the value of which depends on the result of the comparison to be added to the dynamic maximum current to supply the motor. A dynamic limitation method implementing this device is provided.

11 Claims, 7 Drawing Sheets

(56) References Cited

U.S. PATENT DOCUMENTS

2011/0238251 A1* 9/2011 Wright .................... B60L 15/20
                                                            701/22

FOREIGN PATENT DOCUMENTS

| JP | H05-137373 A | 6/1993 |
|----|--------------|--------|
| JP | H10-191686 A | 7/1998 |

* cited by examiner

DYNAMIC LIMITATION DEVICE AND DYNAMIC LIMITATION METHOD IMPLEMENTING A DEVICE OF THIS KIND

CROSS-REFERENCE TO RELATED APPLICATIONS

This application claims priority to foreign French patent application No. FR 1502322, filed on Nov. 4, 2015, the disclosure of which is incorporated by reference in its entirety.

FIELD OF THE INVENTION

The invention relates to the field of the driving of direct-current or alternating-current motors or electrical machines. It relates to a dynamic limitation device of the acceleration and/or power of the motor. The invention also relates to a dynamic limitation method implementing a device of this kind.

BACKGROUND

An electrical machine may operate in starter mode to start a turbine, for example, then in generator mode to provide the necessary electrical power to any system requiring electrical power. In starter mode, during the starting phase, very particular speed profiles are required. A current is generated in this case and this current causes a torque to be generated at the drive shaft to start the turbine, for example. It is sometimes the case that the drive shaft acceleration resulting from this exceeds a maximum acceleration value. This particularly causes premature wear of the mechanical parts of the system, making it necessary to limit acceleration of the drive shaft.

Solutions exist which are based on the principle of a fixed limitation of the current generated. Solutions of this kind are too limiting on the use of the electrical machine. In fact, during the starting phase, the torque setpoint is relatively substantial. In hot weather when the ambient temperature is sufficiently high, the overall resisting torque will be quite low on account of good lubrication. In this particular case, the electrical machine may exceed the maximum acceleration value. However, by placing a limitation on the fixed current, in case of use in cold weather when the overall resisting torque is greater due to the thickening of the lubricants, the maximum acceleration value would not be reached in any event and the fixed current limitation would limit the machine's capacities. It could even prevent starting under certain conditions.

It is therefore desirable to have a solution that allows the maximum acceleration value not to be exceeded, but nevertheless enables the electrical machine to be used optimally, in other words to have a current saturation value that changes as a function of time.

Similarly, it is sometimes necessary to limit the power developed at the motor output.

SUMMARY OF THE INVENTION

The present invention therefore proposes that a given acceleration value will not be periodically exceeded, this being based on a dynamic limitation of the maximum current. The invention likewise proposes the same regulation method of the maximum current for a power limitation.

The aim of the acceleration limitation is to limit premature wear to the mechanical parts of the system. This acceleration limitation also allows surges to be reduced during working mode transitional phases. Ultimately, the acceleration limitation is particularly important to constant-acceleration starts.

To this end, the object of the invention is a dynamic limitation device of at least one dynamic output parameter of an electric motor capable of receiving at least one working setpoint, comprising:

a generator of a dynamic maximum current proportional to a first working setpoint of the motor and intended to supply the motor in order to generate a rotating torque of a shaft of the electric motor as a function of the first setpoint, a first estimator of a first of the at least one dynamic output parameter of the electric motor, a first dynamic limiter of the first output parameter of the motor and in that the first dynamic limiter of the first output parameter of the motor comprises:

a first comparator of the value of the first estimated parameter with a predefined maximum value of the first parameter, a first corrector intended to generate a first correction current, the value of which depends on the result of the comparison and is intended to be added to the dynamic maximum current to supply the motor.

Advantageously, the dynamic limitation device comprises a second estimator of a second of the at least one dynamic output parameter of the electric motor, a second dynamic limiter of the second output parameter of the motor and the second dynamic limiter of the second output parameter of the engine comprises a second comparator of the value of the second estimated parameter with a predefined maximum value of the second parameter, a second corrector intended to generate a second correction current, the value whereof depends on the result of the comparison and is intended to be added to the dynamic maximum current to supply the motor, a selection module intended to select the weaker current from between the first correction current and the second correction current to be added to the dynamic maximum current to supply the motor.

Advantageously, the maximum value of the first parameter is adjustable and may be greater than any possible value of the first parameter.

Advantageously, the maximum value of the second parameter is adjustable and may be greater than any possible value of the second parameter.

According to one embodiment, the maximum value of the second parameter is adjustable and it may be greater than any possible value of the second parameter.

According to another embodiment, the dynamic output parameter may be the acceleration of the drive shaft.

Advantageously, a dynamic output parameter may be the motor output power.

According to another embodiment, the dynamic limitation device further comprises a vector control driving device of the electric motor, the motor comprising a stator comprising windings, said stator being capable of receiving a driving current and producing a rotating magnetic field, the stator windings generating a voltage at the motor terminals, a rotor producing a magnetic field intended to follow the rotating magnetic field and the driving device comprises a generator of a current in a vector domain, a calculator configured to carry out a transform of the current from the vector domain to a real domain allowing for generation of the driving current, an inverse calculator configured to carry out an inverse transform of a measured parameter in the real domain on the stator windings into an inverse transform of the parameter in the vector domain, a comparator of the value of the inverse transform of the parameter with a predefined maximum parameter value, the result whereof allows the generator of the current in the vector domain to be driven.

Advantageously, the current generated by the generator of the current in the vector domain is a direct setpoint current established in Park coordinates and the calculator is configured to receive a quadrature setpoint current established in Park coordinates and proportional to the working setpoint.

Advantageously, the measured parameter in the real domain is the voltage at the terminals of the motor.

According to one embodiment, the generator of the current is a defluxing corrector delivering the current:

zero if the value of the inverse transform of the parameter is less than the predefined maximum parameter value or non-zero if the value of the inverse transform of the parameter is greater than or equal to the predefined maximum parameter value.

The invention also relates to a dynamic limitation method implementing a device of this kind comprising the following steps:

comparison of the value of the first estimated parameter with a maximum value of the predefined first parameter, generation of a first correction current, the value of which depends on the result of the comparison, intended to be added to the dynamic maximum current to supply the motor, in such a manner that the first parameter does not exceed the maximum value of the first parameter and the first parameter corresponds to the working setpoint.

The dynamic limitation method may comprise the following steps:

comparison of the value of the second estimated parameter with a maximum value of the second predefined parameter, generation of a second correction current, the value of which depends on the result of the comparison, intended to be added to the dynamic maximum current to supply the motor, in such a manner that the second parameter does not exceed the maximum value of the second parameter and the second parameter corresponds to the working setpoint.

The dynamic limitation method may moreover comprise a stage for selecting the weaker current from between the first correction current and the second correction current to be added to the dynamic maximum current to supply to the motor.

BRIEF DESCRIPTION OF THE DRAWINGS

The invention will be better understood and other advantages will become apparent on reading the detailed description of an embodiment given by way of example, the description being illustrated by the attached drawing in which.

In the interests of clarity, the same elements will be assigned the same reference numbers in the different figures.

DETAILED DESCRIPTION

In this application, we speak about electric motors in general terms. It should be noted that the invention relates to any AC or DC converter that supplies a rotating machine, whether this is a direct-current or alternating-current machine.

Figure 1:
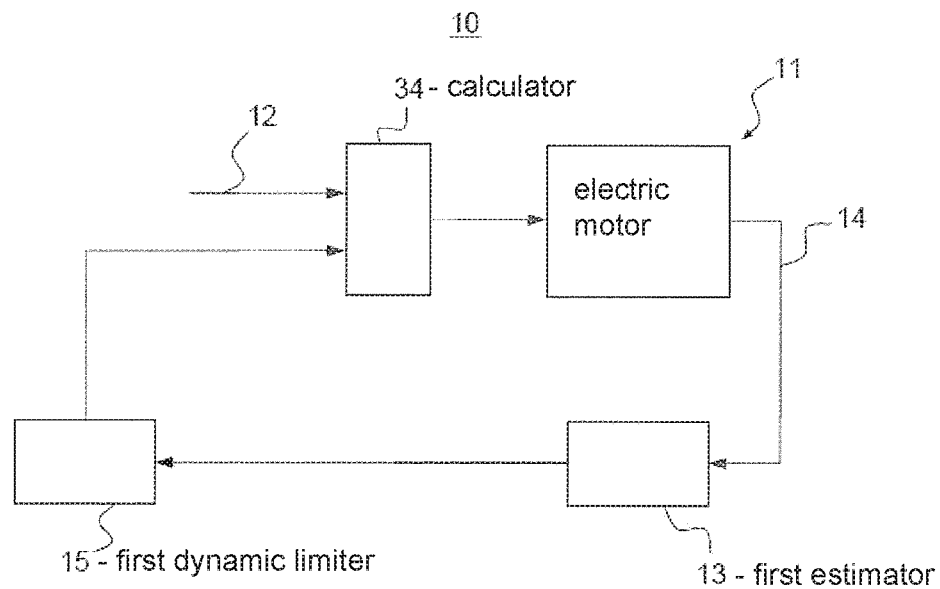
FIG. 1 schematically represents a dynamic limitation device of the acceleration of the drive shaft according to the invention.

FIG. 1 schematically represents a dynamic limitation device 10 of the acceleration of the drive shaft according to the invention. The device 10 is a dynamic limitation device for at least one dynamic output parameter of an electric motor 11 capable of receiving at least one working setpoint 12. According to the invention, the dynamic limitation device 10 comprises a generator of a dynamic maximum current proportional to a first working setpoint 12 of the motor 11 and intended to generate a rotational torque of a shaft of the electric motor 11 as a function of the first setpoint 12. According to the invention, the dynamic limitation device 10 also comprises a first estimator 13 of a first of the at least one dynamic output parameter 14 of the electric motor 11. It further comprises a first dynamic limiter 15 of the first output parameter 14 of the motor 11.

Taking the example of the drive shaft acceleration as being the first parameter 14, it can first be seen that a working setpoint 12, for example a speed setpoint, is generated. A current then circulates towards the inverter to transfer a corresponding current to the motor 11. The corresponding current must not exceed a certain maximum value Imax. This current makes the motor 11 generate a rotational torque, causing the drive shaft to turn. An acceleration of the drive shaft results from this. The acceleration is then estimated or measured by the first estimator 13. In the example in which the first parameter 14 is acceleration, the first estimator 13 may be an accelerometer, or else the estimated acceleration may be obtained by several speed derivations and by finding the average of the values obtained, or else by Kalman filtering or by any algorithm for estimating the acceleration. It is desirable for this measurement or estimation to offer a good degree of accuracy. Nevertheless, it is important to take account of the response time for this estimation, although a reasonable balance must be struck between accuracy and response time. The estimated or measured acceleration value is then compared with a predefined maximum value by means of the first comparator 16.

Figure 2:
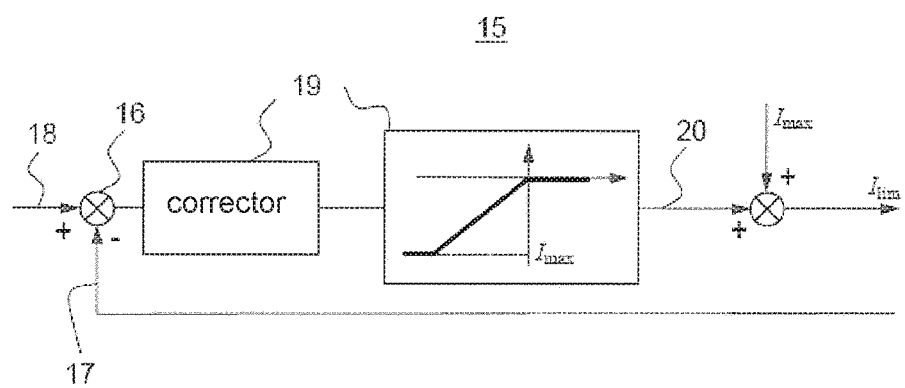
FIG. 2 schematically represents an acceleration limiter according to the invention.

FIG. 2 schematically represents the first acceleration limiter 15 according to the invention. The first dynamic limiter 15 of the first output parameter 14, in this example acceleration, of the motor 11, comprises a first comparator 16 of the value of the first parameter 14 estimated 17 with a predefined maximum value 18 of the first parameter 14. The first limiter 15 also comprises a first corrector 19 intended to generate a first correction current 20, the value of which depends on the result of the comparison, intended to be added to the dynamic maximum current to supply the motor 11. The first corrector motor 19 may be a proportional-integral corrector.

If the measured or estimated acceleration value is lower than the predefined maximum value 18, the current limit remains unchanged. On the other hand, if the measured or estimated acceleration value is greater than the predefined maximum value 18, the current limit is then reduced until a measured or estimated acceleration value is obtained which is equal to the maximum acceleration value 18.

The first proportional-integral corrector 19 allows a zero error to be guaranteed. As shown in FIG. 2, the integral action of the corrector 19 is saturated at 0 for positive values and at −Imax for negative values, Imax being the maximum authorised current value. In other words, if the measured or estimated acceleration value is lower than the predefined maximum value 18, there is no need to limit the acceleration, the first correction current 20 is zero. If the measured or estimated acceleration value is greater than the predefined maximum value 18, it is then necessary to limit the acceleration in order to avoid any problem with wearing parts and other disadvantages referred to above. The first correction current 20 will have a value of between 0 and −Imax, as a function of the difference between the estimated value and the maximum value. The higher the estimated or measured acceleration, the more the first correction current 20 will take a value close to −Imax. Based on the same principle, with an estimated acceleration value is which higher than but close to the predefined maximum value, the first correction current 20 will take a value close to 0. The first correction current 20 is added to the dynamic maximum current. If the measured or estimated acceleration value is greater than the predefined maximum value 18, a negative current, in other words the first correction current 20, is added to the static maximum current. This produces a dynamic maximum current which is decreasing.

Figure 3:
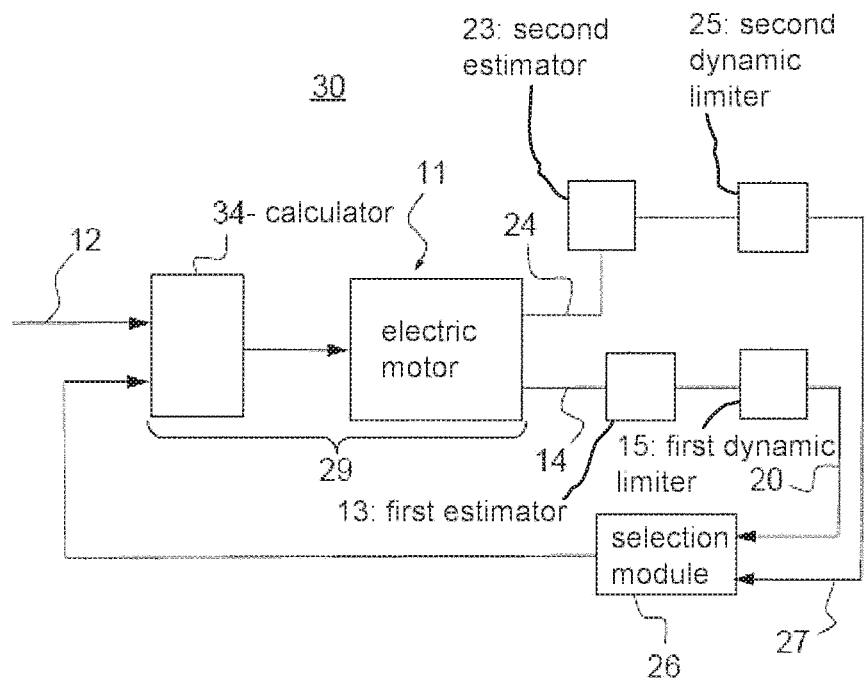
FIG. 3 schematically represents a dynamic limitation device of the acceleration of the drive shaft and the power at the motor output according to the invention.

FIG. 3 schematically represents a dynamic limitation device 30 of the acceleration of the drive shaft and the power at the motor output according to the invention. The same elements can be found in FIG. 3 as in FIG. 1, namely the electric motor 11 is capable of receiving at least one working setpoint 12. The dynamic limitation device 30 comprises the generator of a dynamic maximum current proportional to the first working setpoint 12 of the motor 11 and intended to supply the motor 11 in order to generate a rotational torque of the shaft of the electric motor 11 as a function of the first setpoint 12. The dynamic limitation device 30 also comprises the first estimator 13 of the first parameter 14, acceleration, of the shaft of the electric motor 11. Moreover, it comprises the first dynamic limiter 15 of the first parameter 14, acceleration, of the shaft of the motor 11.

The dynamic limitation device 30 comprises a second estimator 23 of a second of the at least one dynamic output parameter 24 of the electric motor 11. The dynamic limitation device 30 comprises a second dynamic limiter 25 of the second output parameter 24 of the motor 11. And the second dynamic limiter 25 of the second output parameter 24 of the motor 11 comprises, similarly to the first dynamic limiter 15, a second comparator of the value of the second estimated parameter 24 with a predefined maximum value of the second parameter. The dynamic limitation device 30 according to the invention comprises a second corrector intended to generate a second correction current 27, the value of which depends on the result of the comparison, intended to be added to the dynamic maximum current to supply the motor 11. The second parameter 24 may, for example, be the output power of the motor 11. The second dynamic limiter 25 is identical to the first dynamic limiter 15, but this time inferences are made with the second parameter 24 instead of the first parameter 14, in other words by comparing the estimated power with the predefined maximum power instead of the estimated acceleration with the predefined maximum acceleration.

Finally, the dynamic limitation device 30 according to the invention comprises a selection module 26 intended to select the weaker current from between the first correction current 20 and the second correction current 27 to be added to the dynamic maximum current to supply the motor. As the dynamic limitation on acceleration and the dynamic limitation on power both act on the same parameter which is the dynamic maximum current, the dynamic maximum current has to be able to satisfy the two acceleration and power requirements. By choosing the weaker of the two possible correction currents coming from the corrector of the acceleration limitation loop and the corrector of the power limitation loop, respectively, the smaller dynamic maximum current of the two possible dynamic maximum currents is obtained. Alternatively, each of the correction currents may be added beforehand to the dynamic maximum current and the selection module 26 chooses the weaker dynamic maximum current of the two dynamic maximum currents coming from each of the two limitation loops.

It is possible to have the maximum value of the first parameter which is adjustable and it may be greater than any possible value of the first parameter. Alternatively, the maximum value of the second parameter may be adjustable and it may be greater than any possible value of the second parameter. Or else, the two maximum values of the first and second parameters, respectively, may both be adjustable and take values higher than any possible value of the first and second parameters, respectively. In other words, the maximum acceleration and/or power values authorised is fixed at a value which is broadly greater than a standard maximum value. Hence, when the first and/or second comparator(s) compare(s) the value of the first and/or second estimated parameter with the predefined maximum value of the first and/or second parameters, the estimated value is always lower than the maximum value concerned, so there is no limitation. By proceeding in this manner, the dynamic acceleration limitation loop and the dynamic power limitation loop are present, but the maximum value of a parameter greater than any possible value of this parameter allows the corresponding dynamic limitation loop to be taken out of service, in other words the corresponding dynamic limitation loop is deactivated in a manner of speaking.

It may likewise be noted that this reasoning can be arrived at with absolute values of the maximum values of a parameter. In effect, if the first and/or second parameter(s) was a negative value parameter, the first and/or second corrector(s) would generate a correction current, the value of which would fall between 0 and the saturation value Imax. And in this case, by analogy, the absolute value of the maximum value of the first parameter could be adjustable and it could be greater than any possible value of the first parameter.

Moreover, the dynamic limitation device according to the invention may comprise a vector control driving device 29 of the electric motor 11.

Figure 4:
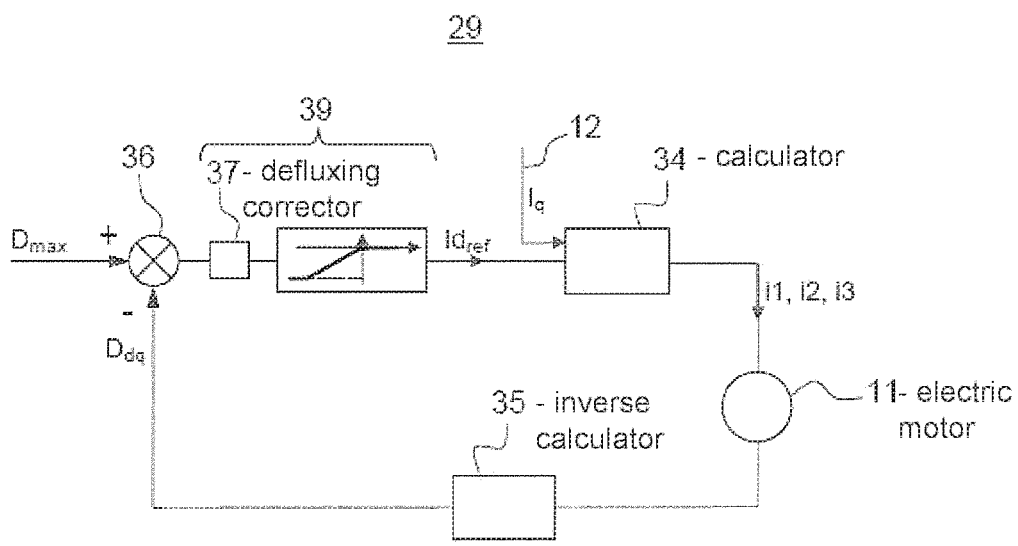
FIG. 4 schematically represents a vector control driving device of a motor according to the invention.

FIG. 4 schematically represents a vector control driving device 29 of this kind of the motor 11 capable of receiving the working setpoint 12. The working setpoint 12 may be a speed setpoint or also a torque setpoint to be delivered by the motor 11. The motor 11 comprises a stator comprising windings. The stator is suitable for receiving a driving current and producing a rotating magnetic field, the stator windings generating a voltage fcem at the terminals of the motor 11. This voltage is commonly referred to as back-electromotive force. The motor 11 comprises a rotor comprising permanent magnets which produce a magnetic field intended to follow the rotating magnetic field. The driving device 29 comprises a generator 33 of a current Idref in a vector domain. The device likewise comprises a calculator 34 configured to carry out a transform of the current Idref from the vector domain to a real domain, allowing for the generation of the driving current i1, i2, i3 for the three-phase current. The device 29 comprises an inverse calculator 35 configured to carry out an inverse transform of a parameter measured in the real domain on the stator windings of the motor 11 into a transform of the parameter Ddq in the vector domain. The parameter measured in the real domain may, for example, be a voltage fcem at the terminals of the motor, also commonly referred to using the term back-electromotive force, or else a speed measured at the terminals of the motor 11. In case of speed, the inverse calculator 35 carries out an inverse transform of the speed measured at the terminals of the motor 11 into a transform of the speed to give the value w, corresponding to the electrical pulsing obtained from the electrical frequency f by the operation w=2πf (the electrical frequency f itself being obtained by multiplying the number of poles of the electric machine by the rotational frequency of the rotor). The value w is transferred to the calculator 34.

More specifically, values vdref and vqref, components of the voltage on the direct axis d and the transverse axis q, respectively, of the vector domain, are calculated from the currents Idref, Iq and from the electrical pulsing w. The values vdref and vqref are reduced to duty cycle, corresponding to an image of the voltage lying between 0 and 1. The modulus of the duty cycle is the value Ddq. In other words, the invention makes it possible to work with voltages in the real domain and images of these voltages in the vector domain, without any need for a voltage sensor.

The device 29 ultimately comprises a comparator 36 of the value of the inverse transform of the parameter Ddq with a predefined maximum value Dmax of the parameter, the result of which makes it possible to drive the generator 33 of the current in the vector domain.

The quantities of the real domain correspond to the real quantities that are measured on the device 29. In particular, a real voltage or a real current can be cited.

The vector domain refers to a domain in which a quantity is broken down into two components on a direct axis d and a transverse axis q. The vector domain corresponds to a rotating reference frame linked to the magnetic field of the stator.

Hence, the current Idref generated by the generator 33 of the current in the vector domain is a direct setpoint current established in Park coordinates and the calculator 35 is configured to receive a quadrature setpoint current Iqref established in Park coordinates and proportional to the speed (or torque) setpoint that the motor 11 receives.

More specifically, the generator 33 of the current is a defluxing corrector which delivers the current Idref that is zero if the value of the inverse transform of the parameter is less than the predefined maximum parameter value (in other words, lower than the value Dmax) or non-zero if the value of the inverse transform of the parameter (in other words, the voltage Ddq) is greater than or equal to the predefined maximum parameter value Dmax.

The comparator 36 determines whether the value of Ddq is less than or greater than or equal to the value Dmax. A defluxing corrector 37 then delivers the corresponding current Idref. The defluxing corrector 37 may be a proportional integral corrector or a purely integral corrector, for example.

It should be noted that the current Idref is zero if the value of Ddq is less than the value Dmax. When the value of Ddq is greater than the value Dmax, the corrector 37 generates a negative current Idref.

The vector control driving device 29 particularly allows a speed adjustment. This speed adjustment may be added to the dynamic limitation on acceleration and/or power, but it is not necessary.

In the following, we arbitrarily choose acceleration as the first parameter and power as the second parameter. It is of course possible for them to be interchanged without going beyond the scope of the invention. The invention may likewise be applied to parameters other than acceleration and power. Ultimately, the invention may be extended analogously to the dynamic limitation of a third, fourth or perhaps more parameters.

Figure 5:
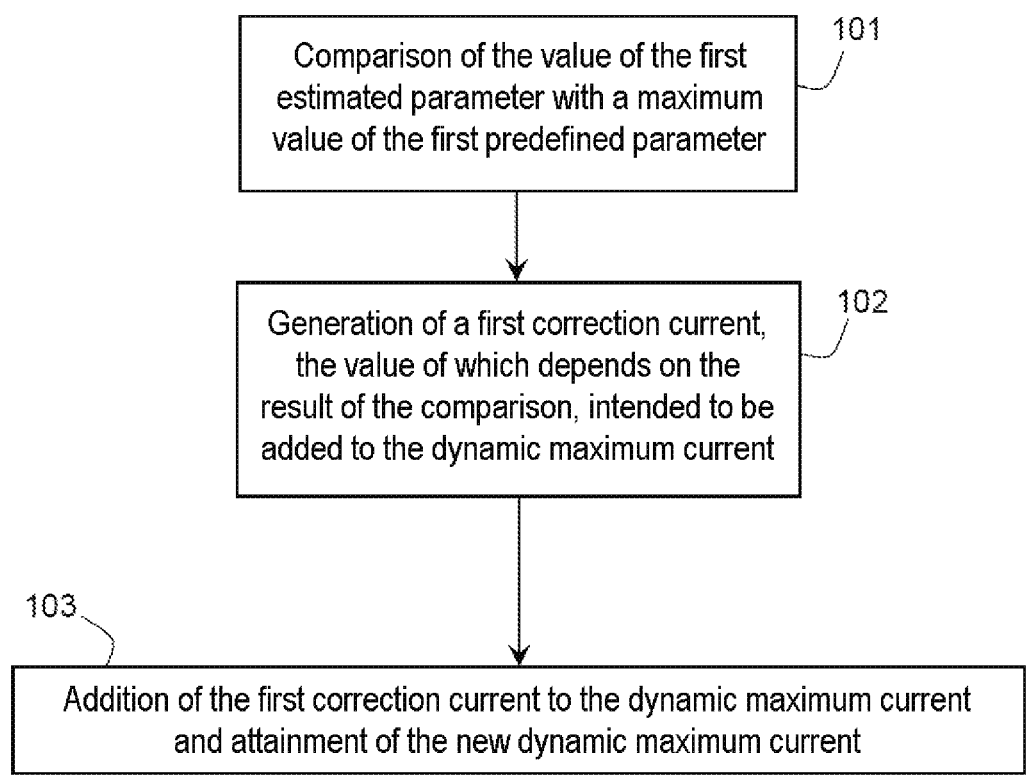
FIG. 5 represents the steps of a dynamic limitation method of a parameter according to the invention.

FIG. 5 represents steps in a dynamic limitation method of a parameter according to the invention. The limitation method comprises a step 101 for comparing the value of the first estimated parameter with a maximum value of the first predefined parameter. It then comprises a step 102 for generating a first correction current, the value of which depends on the result of the comparison. Then, during one step 103, the first correction current is added to the dynamic maximum current to obtain a new dynamic maximum current, in such a manner that the first parameter does not exceed the maximum value of the first parameter and the first parameter corresponds to the working setpoint.

Figure 6:
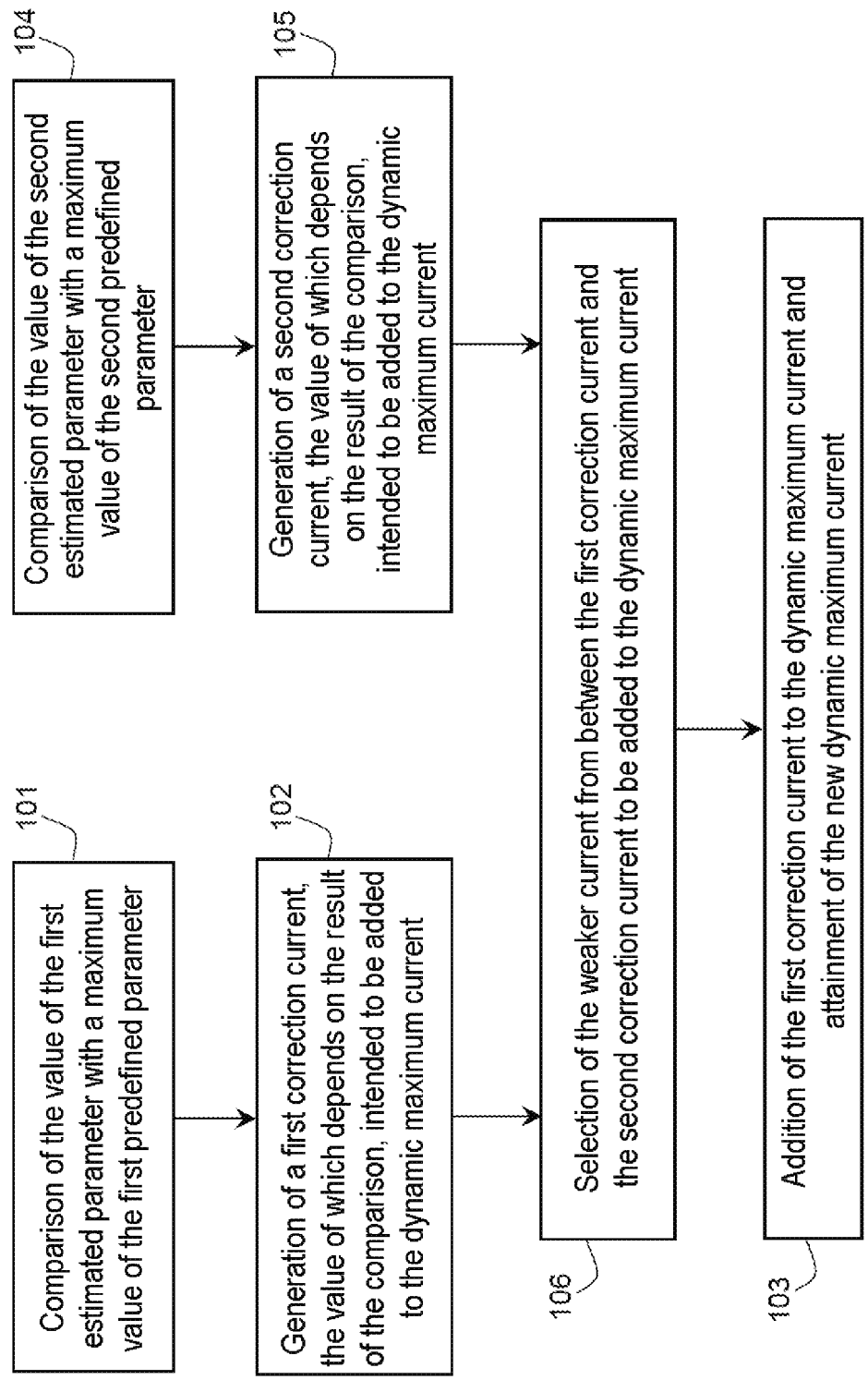
FIG. 6 represents the steps of a dynamic limitation method of two parameters according to the invention.

FIG. 6 depicts steps in a dynamic limitation method of two parameters according to the invention. The dynamic limitation method comprises the same steps 101 and 102 as those shown in FIG. 3. In parallel with steps 101 and 102, the dynamic limitation method according to the invention comprises a step 104 for comparing the value of the second estimated parameter with a maximum value of the second predefined parameter and a step 105 for generating a second correction current, the value of which depends on the result of the comparison. The dynamic limitation method according to the invention presented in FIG. 6 moreover comprises a step 106 for selecting the weaker current from between the first correction current and the second correction current to be added to the dynamic maximum current. Finally, during step 103, the correction current selected during step 106 is added to the dynamic maximum current to obtain a new dynamic maximum current, in such a manner that the first parameter does not exceed the maximum value of the first parameter, the second parameter does not exceed the maximum value of the second parameter and the first and second parameters correspond to the working setpoint. Alternatively, step 103 may be realised before step 106, in which case selection step 106 then involves selecting the weaker dynamic maximum current from between the two dynamic maximum currents previously obtained.

As previously explained, we have considered acceleration and power in an example, but this method can be extended to a plurality of other parameters, each group of steps for comparing estimated and maximum values and correction current generation being taken in parallel with one another, one group per parameter. There then follows step 106 for selecting the correction current and step 103 for adding the selected correction current to the dynamic maximum current, in order to obtain the new dynamic maximum current which satisfies all the requirements of all parameters under consideration.

Figure 7:
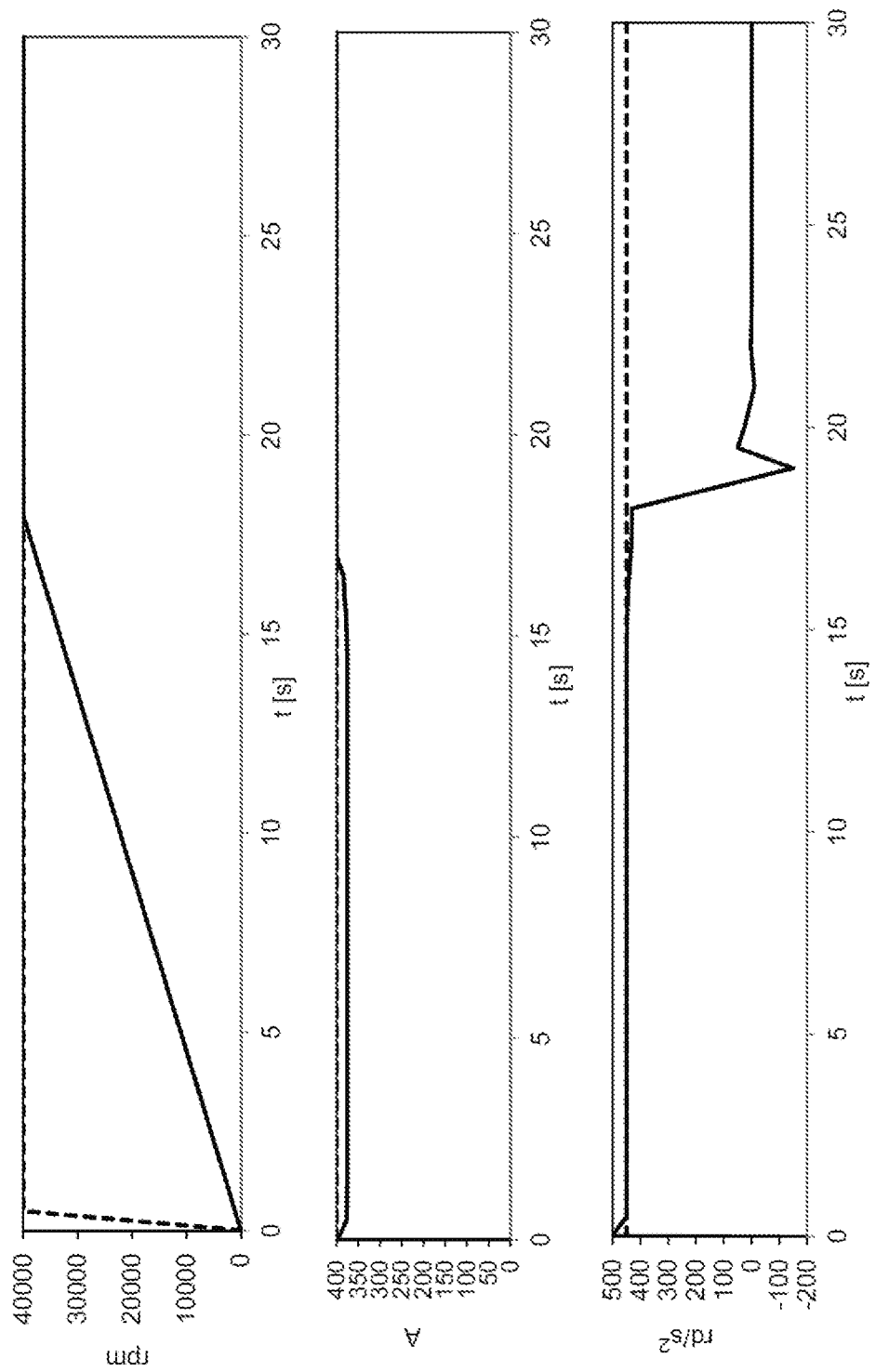
FIG. 7 represents a graph illustrating the speed, acceleration and current values produced by a start-up simulation with dynamic acceleration limits according to the invention.

FIG. 7 represents a graph illustrating the speed, acceleration and current values coming from a start-up simulation with dynamic limitation on acceleration according to the invention. The graph at the top in FIG. 7 illustrates speed as a function of time and, more particularly, a controlled-speed start-up with a speed step of 40000 rpm as the setpoint shown as a dotted line. From the initial time until the setpoint plateau is reached in terms of speed, the measured speed increases linearly. The graph in the middle of FIG. 7 illustrates the change in the dynamic maximum current as a function of time, with a maximum current value, as a dotted line, fixed at 400A. The graph at the bottom in FIG. 7 illustrates acceleration as a function of time, with a maximum acceleration value of 450 radian/$s^2$, as a dotted line. At the beginning of the start-up, as it is desirable for the speed to meet the speed setpoint, a current is generated. At the same time, the measured acceleration exceeds the maximum acceleration value. It can then be seen that the value of the dynamic maximum current drops slightly, so that the acceleration is stabilised at the authorised maximum value. In other words, the first comparator of the first limiter has compared the value of the first estimated parameter, in this case acceleration, with a predefined maximum value of the first parameter, in this case 450 radian/$s^2$. As the result of the comparison shows, when the measured value is greater than the maximum authorised value of 450 radian/$s^2$, the first corrector generates a first negative correction current. This first correction current is added to the dynamic maximum current which decreases.

Figure 8:
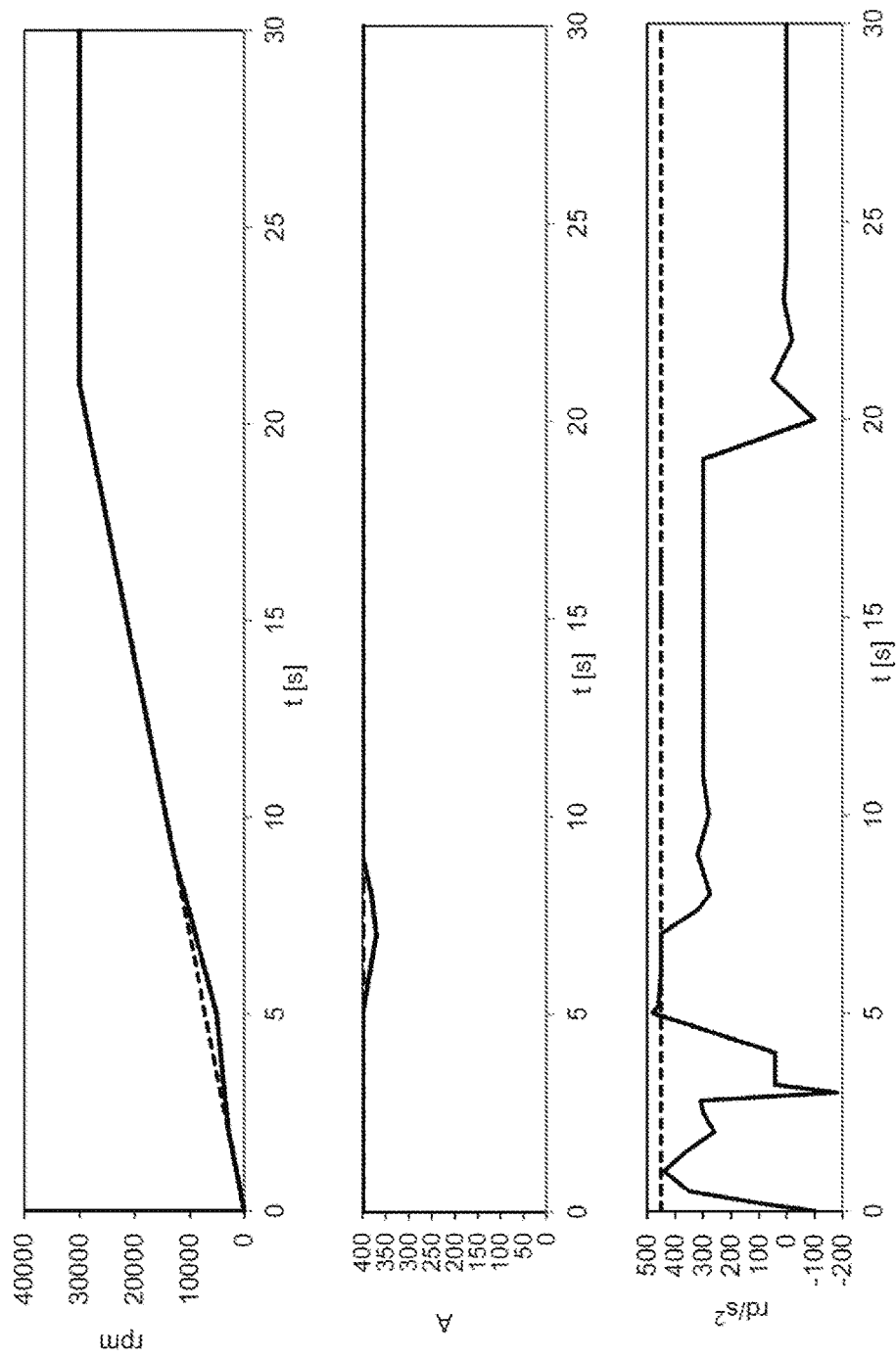
FIG. 8 depicts a graph illustrating the speed, acceleration and current values produced by a start-up simulation on a speed ramp with torque surge, with dynamic limitation on acceleration according to the invention.

FIG. 8 represents a graph illustrating the speed, acceleration and current values coming from a start-up simulation on a speed ramp with torque surge, with dynamic limitation on acceleration according to the invention. The graph at the top in FIG. 8 illustrates speed as a function of time and, more particularly, a speed ramp start-up then a speed step to 30000 rpm. The speed setpoint is represented as a dotted line. From the initial time until the plateau of the speed setpoint is reached, the measured speed setpoint increases linearly. The graph in the middle in FIG. 8 illustrates the change in the dynamic maximum current as a function of time, with a maximum current value fixed at 400A, as a dotted line. The graph at the bottom in FIG. 8 illustrates acceleration as a function of time, with a maximum acceleration value, drawn as a dotted line, of 450 radian/$s^2$. A significant torque step is applied to the load for 2 seconds during the start-up phase. This torque step has the effect of a resistant torque and leads to an uncoupling of the measured speed visible in the top graph. In fact, at this stage in the start-up the maximum value of the current is reached. It is not possible to generate more current. Once the torque step has passed, beyond t=5 seconds, in order to regain the speed setpoint, greater acceleration is produced, exceeding the authorised maximum acceleration value, as shown in the bottom graph at t=5 seconds. The dynamic limitation method of the acceleration then works by reducing the dynamic maximum current, which can be seen on the middle graph at t=5 seconds. At this point in time, as explained previously for the case depicted in FIG. 7, the first comparator of the first limiter has compared the value of the first estimated parameter, in this case acceleration, with a predefined maximum value of the first parameter, in this case 450 radian/$s^2$. As the result of the comparison indicating when the measured value is greater than the authorised maximum value of 450 radian/$s^2$, the first corrector generates a first negative correction current. This first correction current is added to the dynamic maximum current, which decreases.

Consequently, towards t=8 seconds, the dynamic maximum current increases again and the measured speed coincides with the speed setpoint. The invention therefore allows the speed to return to the setpoint speed, whereas a start-up with limited acceleration, in other words without dynamic limitation, would not allow the return to the speed setpoint.

Hence, the invention allows a given acceleration not to be exceeded, whatever the speed setpoint imposed and the possible torque steps applied, while at the same time allowing the setpoint to be optimally observed. All the mechanical parts involved during the start-up phase are thereby protected from premature wear.

Figure 9:
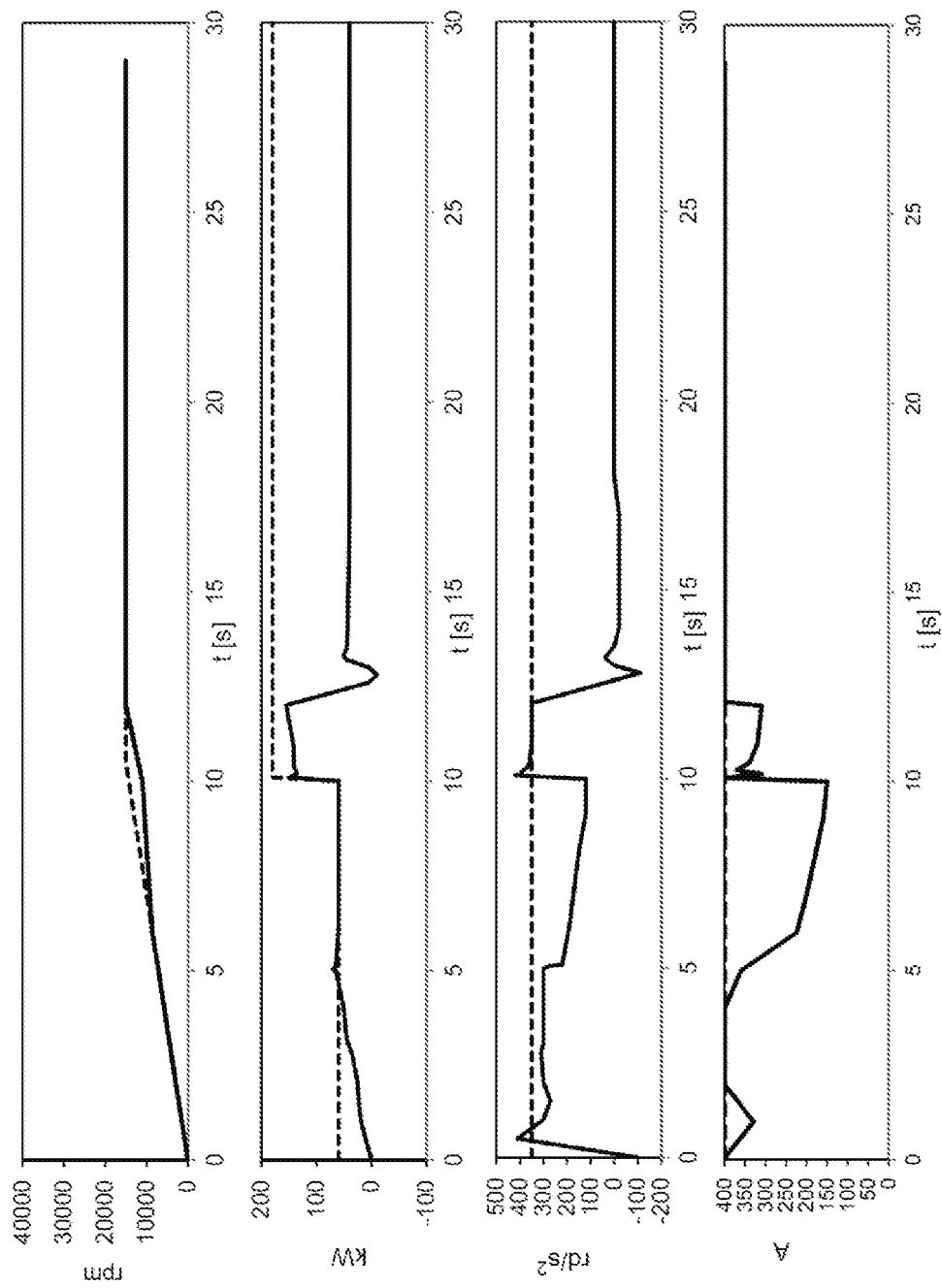
FIG. 9 depicts a graph illustrating the speed, power, acceleration and current values produced by a start-up simulation with dynamic limitation on acceleration and power according to the invention.

FIG. 9 depicts a graph illustrating the speed, power, acceleration and current values coming from a start-up simulation with dynamic limitation on acceleration and power according to the invention. The graph at the top in FIG. 9 illustrates speed as a function of time and, more particularly, a speed ramp start-up then a speed step to 30000 rpm. The speed setpoint is represented as a dotted line. From the initial time until the plateau of the speed setpoint is reached, the measured speed setpoint increases linearly. Under the speed graph is represented the graph illustrating power as a function of time, with a maximum power value of 60 kW up to 10 seconds then 180 kW from 10 seconds on, as a dotted line. Below the power graph is represented the graph illustrating acceleration as a function of time, with a maximum acceleration value of 350 radian/$s^2$. Below the acceleration graph is represented the graph illustrating the current as a function of time, with a maximum current value, in other words, a saturation current, of 400 A, shown as a dotted line. At the beginning of the start-up, the power and acceleration increase in such a manner that the speed returns to the speed setpoint. At around t=1 second, the acceleration exceeds the maximum value, which causes a reduction in the dynamic maximum current. In other words, the first comparator of the first limiter has compared the value of the first estimated parameter, in this case acceleration, with a predefined maximum value of the first parameter, in this case 350 radian/$s^2$. As the result of the comparison indicating when the measured value is greater than the authorised maximum value of 350 radian/$s^2$, the first corrector generates a first negative correction current. This first correction current is added to the dynamic maximum current, which decreases.

At t=5 seconds, the power exceeds the maximum power value of 60 kW. A power limitation phase slows down the speed. The dynamic maximum current in this case is greatly reduced. In other words, the second comparator of the second limiter has compared the value of the second estimated parameter, in this case the power, with a predefined maximum value of the first parameter, in this case 60 kW. As the result of the comparison indicates, when the measured value is greater than the maximum authorised value of 60 kW, the second corrector generates a second negative correction current. In the presence of a first correction current and a second correction current, the selection module selects the current from between the first correction current and the second correction current to add to the dynamic maximum current, in order to obtain the dynamic maximum current which will respond to the two power and acceleration limitations. It is then the smaller of the two dynamic maximum currents that is chosen.

At t=10 seconds, the maximum power value changes from 60 to 180 kW; there is then no longer any power limitation. In order to obtain a speed that returns to the speed setpoint, a significant acceleration is produced. Because this acceleration is greater than the value of 350 radian/$s^2$, the dynamic limitation method on the acceleration then works by reducing the dynamic maximum current, as can be seen on the graphs between 10 and 12 seconds. It will also be noted that the invention allows the speed to reach the speed setpoint quickly, while at the same time ensuring that the maximum acceleration and power values are not exceeded. An additional advantage of the invention lies in the fact that the limitation on the acceleration and/or the power is dynamic. Each of the parameters changes within authorised value ranges and allows the working setpoint to be optimally met, namely as quickly as possible and without exceeding predefined maximum values for certain parameters.

The invention claimed is:

1. A dynamic limitation device of at least one dynamic output parameter of an electric motor capable of receiving at least one working setpoint, a first of the at least one dynamic output parameter being the drive shaft acceleration, comprising:
 a generator of a dynamic maximum current proportional to a first working setpoint of the motor and intended to supply the motor in order to generate a rotating torque of a shaft of the electric motor as a function of the first setpoint,
 a first estimator of the acceleration of the electric motor,
 a first dynamic limiter of the acceleration of the motor,
 and wherein the first dynamic limiter of the acceleration of the motor comprises:
  a first comparator of the value of the estimated acceleration with a predefined maximum value of the acceleration,
  a first corrector intended to generate a first correction current, the value of which depends on the result of the comparison and is intended to be added to the dynamic maximum current to supply the motor.

2. The dynamic limitation device according to claim 1, a second of the at least one dynamic output parameter being the output power of the motor, comprising:
 a second estimator of the output power of the electric motor,
 a second dynamic limiter of the output power of the motor,
 and wherein the second dynamic limiter of the output power of the motor comprises:
  a second comparator of the value of the estimated power with a predefined maximum value of the power,
  a second corrector intended to generate a second correction current, the value whereof depends on the result of the comparison and is intended to be added to the dynamic maximum current to supply the motor,
  a selection module intended to select the weaker current from between the first correction current and the second correction current to be added to the dynamic maximum current to supply the motor.

3. The dynamic limitation device according to claim 1, wherein the maximum value of the acceleration is adjustable and wherein it may be greater than any possible value of the acceleration.

4. The dynamic limitation device according to claim 2, wherein the maximum value of the power is adjustable and wherein it may be greater than any possible value of the power.

5. The dynamic limitation device according to claim 1, wherein it further comprises a vector control driving device of the electric motor, the motor comprising:
 a stator comprising windings, capable of receiving a driving current and producing a rotating magnetic field, the stator windings generating a voltage at the motor terminals
 a rotor producing a magnetic field intended to follow the rotating magnetic field and wherein the driving device comprises:
  a generator of a current in a vector domain,
  a calculator configured to carry out a transform of the current of the vector domain to a real domain allowing for generation of the driving current,
  an inverse calculator configured to carry out an inverse transform of a measured parameter in the real domain on the stator windings into an inverse transform of the parameter in the vector domain,
  a comparator of the value of the inverse transform of the parameter with a predefined maximum value of the parameter, the result whereof allows the generator of the current in the vector domain to be driven.

6. The dynamic limitation device according to claim 5, wherein the current generated by the generator of the current in the vector domain is a direct setpoint current established in Park coordinates and the calculator is configured to receive a quadrature setpoint current established in Park coordinates and proportional to the working setpoint.

7. The dynamic limitation device according to claim 5, wherein the measured parameter in the real domain is the voltage at the terminals of the motor.

8. The dynamic limitation device according to claim 7, wherein the generator of the current is a defluxing corrector delivering the current:
 zero if the value of the inverse transform of the parameter is less than the predefined maximum parameter value or
 non-zero if the value of the inverse transform of the parameter is greater than or equal to the predefined maximum parameter value.

9. The dynamic limitation method implementing a dynamic limitation device of at least one dynamic output parameter of an electric motor capable of receiving at least one working setpoint, a first of the at least one dynamic output parameter being the acceleration of the drive shaft, comprising:
 a generator of a dynamic maximum current proportional to a first working setpoint of the motor and intended to supply the motor in order to generate a rotating torque of a shaft of the electric motor as a function of the first setpoint,
 a first estimator of the acceleration of the drive shaft,
 a first dynamic limiter of the acceleration of the drive shaft,
 the first dynamic limiter of the acceleration of the drive shaft comprising:
  a first comparator of the value of the estimated acceleration with a predefined maximum value of the acceleration,
  a first corrector intended to generate a first correction current, the value of which depends on the result of the comparison and is intended to be added to the dynamic maximum current to supply the motor,
 comprising the following steps:
  comparison of the value of the estimated acceleration with a maximum value of the predefined acceleration,
  generation of a first correction current, the value of which depends on the result of the comparison, intended to be added to the dynamic maximum current to supply the motor, in such a manner that the acceleration of the drive shaft does not exceed the maximum value of the acceleration and the acceleration corresponds to the working setpoint.

10. The dynamic limitation method according to claim 9, a second of the at least one dynamic output parameter being the output power of the motor, the dynamic limitation device comprising:
- a second estimator of the output power of the electric motor,
- a second dynamic limiter of the output power of the motor, the second dynamic limiter of the output power of the motor comprising:
- a second comparator of the value of the estimated power with a predefined maximum value of the power,
- a second corrector intended to generate a second correction current, the value whereof depending on the result of the comparison and is intended to be added to the dynamic maximum current to supply the motor, comprising the following steps:
- comparison of the value of the estimated power with a maximum value of the predefined power,
- generation of a second correction current, the value of which depends on the result of the comparison, intended to be added to the dynamic maximum current to supply the motor, in such a manner that the power does not exceed the maximum value of the power and the power corresponds to the working setpoint.

11. The dynamic limitation method according to claim 10, the dynamic limitation device comprising a selection module intended to select the weaker current from between the first correction current and the second correction current to be added to the dynamic maximum current to supply the motor, further comprising a selection step of the weaker current from between the first correction current and the second correction current to be added to the dynamic maximum current to supply the motor.

* * * * *